United States Patent
Liang et al.

(10) Patent No.: US 8,175,416 B2
(45) Date of Patent: May 8, 2012

(54) PIXEL INTERPOLATION APPARATUS AND METHOD THEREOF

(75) Inventors: Ren-Kuan Liang, Taichung County (TW); Meng-Che Tsai, Taipei (TW)

(73) Assignee: Mstar Semiconductor, Inc., Hsinchu Hsien (TW)

( * ) Notice: Subject to any disclaimer, the term of this patent is extended or adjusted under 35 U.S.C. 154(b) by 1045 days.

(21) Appl. No.: 12/149,155

(22) Filed: Apr. 28, 2008

(65) Prior Publication Data
US 2008/0279479 A1 Nov. 13, 2008

(30) Foreign Application Priority Data
May 7, 2007 (TW) .............................. 96116190 A

(51) Int. Cl.
*G06K 9/32* (2006.01)
(52) U.S. Cl. .............................. 382/300; 348/448
(58) Field of Classification Search .................. 382/300; 348/448, 458–459
See application file for complete search history.

(56) References Cited

U.S. PATENT DOCUMENTS

| | | | | |
|---|---|---|---|---|
| 5,019,903 A * | 5/1991 | Dougall et al. | ............... | 348/448 |
| 5,134,480 A * | 7/1992 | Wang et al. | ............... | 348/620 |
| 5,602,654 A * | 2/1997 | Patti et al. | ............... | 358/461 |
| 5,875,268 A * | 2/1999 | Miyake | ............... | 382/276 |
| 6,611,294 B1 * | 8/2003 | Hirano et al. | ............... | 348/459 |
| 6,731,342 B2 * | 5/2004 | Shin et al. | ............... | 348/452 |
| 7,218,354 B2 * | 5/2007 | Tanaka | ............... | 348/448 |
| 7,684,486 B2 * | 3/2010 | Ha | ............... | 375/240.16 |
| 7,711,209 B2 * | 5/2010 | Kimura | ............... | 382/300 |
| 2001/0008425 A1 * | 7/2001 | Shin et al. | ............... | 348/452 |
| 2005/0175102 A1 * | 8/2005 | Ha | ............... | 375/240.16 |
| 2005/0225672 A1 * | 10/2005 | Lufkin | ............... | 348/448 |
| 2006/0197868 A1 * | 9/2006 | Ogo | ............... | 348/448 |
| 2008/0130752 A1 * | 6/2008 | Hamakawa et al. | ..... | 375/240.16 |
| 2008/0239146 A1 * | 10/2008 | Namioka | ............... | 348/452 |
| 2008/0279479 A1 * | 11/2008 | Liang et al. | ............... | 382/300 |
| 2010/0245674 A1 * | 9/2010 | Yamasaki et al. | ............. | 348/699 |

FOREIGN PATENT DOCUMENTS

| | | | |
|---|---|---|---|
| JP | 2006060375 A | * | 3/2006 |
| JP | 2007060104 A | * | 3/2007 |
| TW | 200513118 | | 4/2005 |
| TW | 200631408 | | 9/2006 |
| WO | WO-9967952 A1 | | 12/1999 |

OTHER PUBLICATIONS

Yoo, H. et al. "Direction-Oriented Interpolation and It's Application to De-Interlacing", Nov. 2002, IEEE: Transactions on Consumer Electronics, vol. 48, No. 4, p. 954-962.*

Kwon O. et al., "Deinterlacing using Directional Interpolation and Motion Compensation", Feb. 2003, IEEE Transactions on Consumer Electronics, vol. 49, No. 1, p. 198-203.*

* cited by examiner

*Primary Examiner* — Jason M Repko
*Assistant Examiner* — Gandhi Thirugnanam
(74) *Attorney, Agent, or Firm* — Rabin & Berdo, P.C.

(57) ABSTRACT

A pixel interpolation method includes the following steps. First, multiple first macroblocks and second macroblocks are generated according to pixel data of a first real pixel row and pixel data of a second real pixel row, respectively. Next, block matching is performed on the first and second macroblocks to find a minimum block difference and a detected direction of a target pixel belonging to a first interpolated pixel row. Thereafter, the target pixel of the first interpolated pixel row is generated by way of interpolation according to the pixel data of the first and second real pixel rows and the detected direction.

20 Claims, 11 Drawing Sheets ns and pixel data of a second real pixel row. Next, block matching is performed on the first and second macroblocks to find a minimum block difference and a detected direction of a target pixel belonging to a first interpolated pixel row. Thereafter, the target pixel of the first interpolated pixel row is generated by way of interpolation according to the pixel data of the first and second real pixel rows and the detected direction.

PIXEL INTERPOLATION APPARATUS AND METHOD THEREOF

This application claims the benefit of Taiwan application Serial No. 096116190, filed May 7, 2007, the subject matter of which is incorporated herein by reference.

BACKGROUND OF THE INVENTION

1. Field of the Invention

The invention relates in general to a pixel interpolation apparatus, and more particularly to a pixel interpolation apparatus applied to a de-interlacing system.

2. Description of the Related Art

A typical film is shot and played in an interlaced manner. For example, a television plays an odd field and then an even field so that a frame is played. The odd field and the even field are respectively composed of odd display lines and even display lines of this frame. The requirement on the image quality in the current market is getting higher and higher, and the displayed image quality of the non-interlaced method is better than the interlaced image quality. So, the current display method is to de-interlace the interlaced frame and then generate a progressive frame to be played.

The conventional de-interlacing method is to perform the interpolation according to pixels of real pixel rows of an input field to find the pixel data of the target pixel between the real pixel rows so that the progressive frame is obtained. However, the conventional de-interlacing method does not consider the similarity between the pixel data of the real pixel rows to be interpolated and the consistency of the pixel data. So, the obtained progressive frame often has the generated pixel, which has the pixel data discontinuous to the pixel data of the ambient pixels, and the obtained progressive frame has the problems of the flicker, the blur and the nonuniform color.

SUMMARY OF THE INVENTION

The invention is directed to a pixel interpolation apparatus and a method thereof capable of effectively improving the problems of the flicker, the blur and the nonuniform color, which are caused because the conventional de-interlacing method does not consider the similarity between the pixel data to be interpolated and the consistency of the pixel data. Thus, the invention may substantially and advantageously have the higher quality of the progressive image.

According to a first aspect of the present invention, a pixel interpolation apparatus is provided. The apparatus includes a first line buffer, a second line buffer, a block matching unit and an interpolation operation unit. The first and second line buffers are respectively for storing pixel data of a first real pixel row and pixel data of a second real pixel row. The block matching unit coupled to the first and second line buffers generates multiple first macroblocks on the first real pixel row, generates corresponding second macroblocks on the second real pixel row and performs block matching to find a minimum block difference and a detected direction of a target pixel belonging to a first interpolated pixel row. The interpolation operation unit coupled to the block matching unit and the first and second line buffers is for generating the target pixel of the first interpolated pixel row by way of interpolation according to the pixel data of the first and second real pixel rows and the detected direction.

According to a second aspect of the present invention, a pixel interpolation method is provided. The method includes the following steps. First, first macroblocks and second macroblocks are generated according to pixel data of a first real pixel row and pixel data of a second real pixel row. Next, block matching is performed on the first and second macroblocks to find a minimum block difference and a detected direction of a target pixel belonging to a first interpolated pixel row. Thereafter, the target pixel of the first interpolated pixel row is generated by way of interpolation according to the pixel data of the first and second real pixel rows and the detected direction.

The invention will become apparent from the following detailed description of the preferred but non-limiting embodiments. The following description is made with reference to the accompanying drawings.

DETAILED DESCRIPTION OF THE INVENTION

The pixel interpolation apparatus of this embodiment performs block matching on a real pixel row of an interlaced input field to find a minimum block difference and a detected direction of a target pixel in an interpolated pixel row. The pixel interpolation apparatus also generates pixel data of the target pixel according to the detected direction and the pixel data of the real pixel row so as to achieve the de-interlaced operation.

First Embodiment

Figure 1:
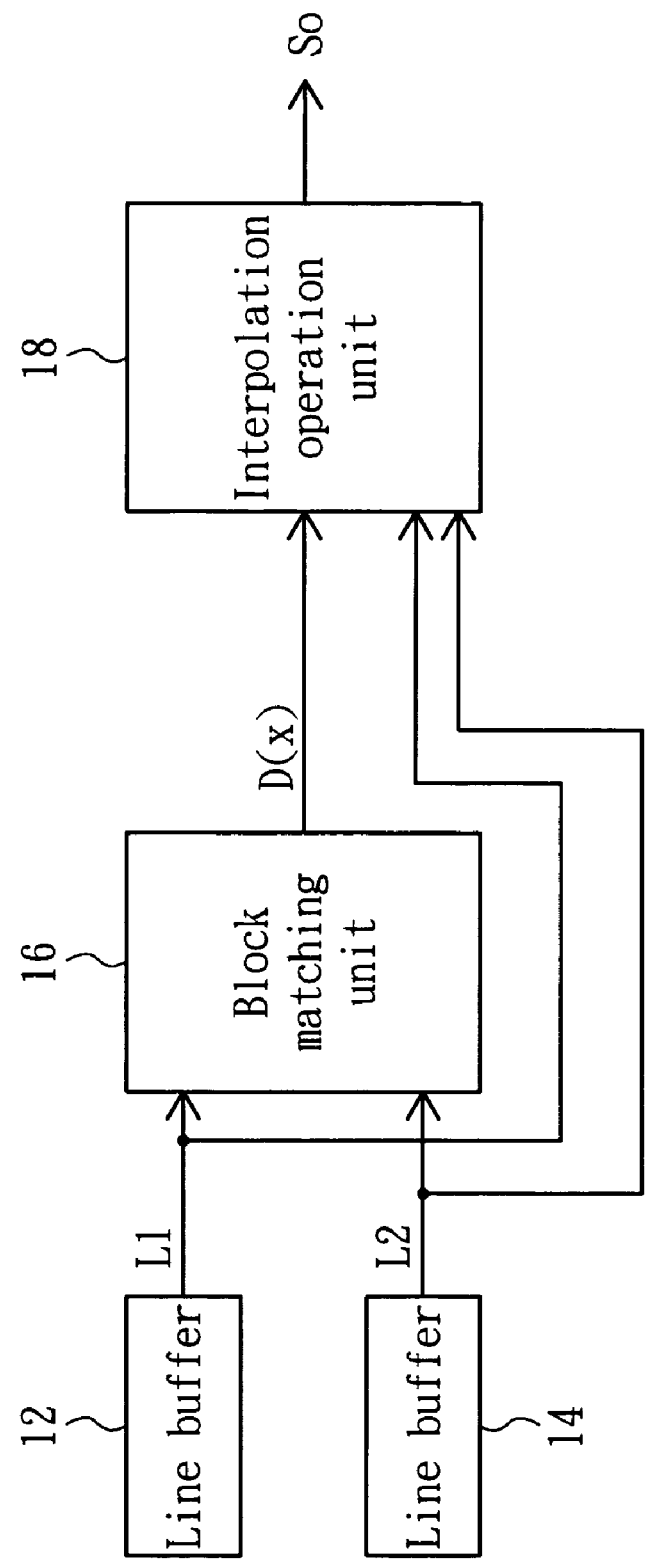
FIG. 1 is a block diagram showing a pixel interpolation apparatus according to a first embodiment of the invention.
Figure 2:
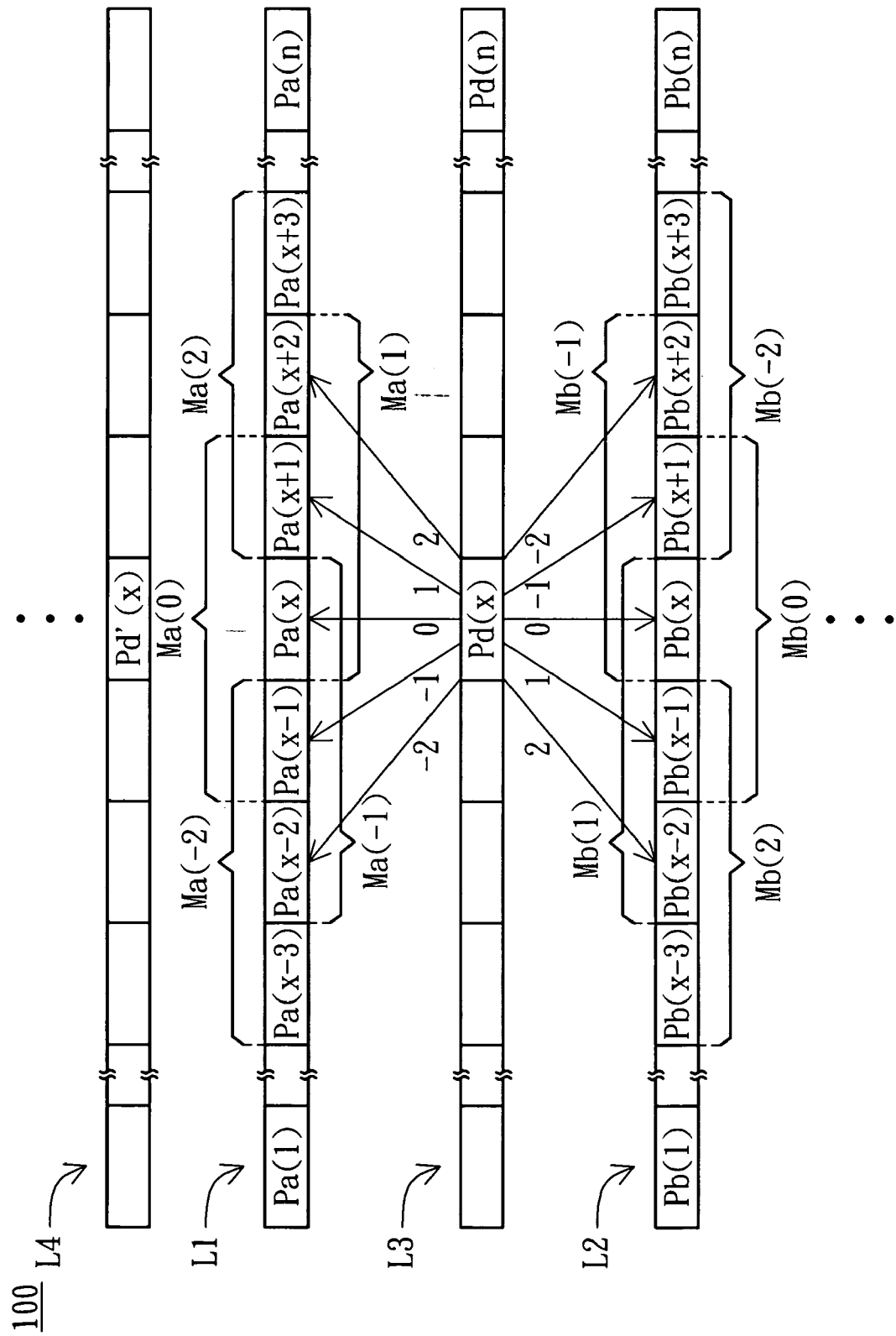
FIG. 2 is a schematic illustration showing a real pixel row and an interpolated pixel row according to the first embodiment of the invention.

FIG. 1 is a block diagram showing a pixel interpolation apparatus 10 according to a first embodiment of the invention. FIG. 2 is a schematic illustration showing at least a real pixel row and at least an interpolated pixel row according to the first embodiment of the invention. As shown in FIGS. 1 and 2, the pixel interpolation apparatus 10 receives interlaced input field data 100 and generates pixel data of each pixel of an interpolated pixel row L3 between real pixel rows L1 and L2 by way of interpolation according to pixel data of the real pixel rows L1 and L2.

The real pixel rows L1 and L2 and the interpolated pixel row L3 respectively include pixels Pa(j) (j=1 to n), Pb(j) and Pd(j), wherein n is a natural number greater than 1. Next, illustrations will be made by taking the operation of the pixel interpolation apparatus 10 for generating pixel data of a target pixel Pd(x) according to the pixel data of the pixels Pa(j) and Pb(j) of the real pixel rows L1 and L2 as an example, wherein x is a natural number ranging from 1 to n.

The pixel interpolation apparatus 10 includes line buffers 12 and 14, a block matching unit 16 and an interpolation operation unit 18. The line buffers 12 and 14 respectively store the pixel data of the real pixel rows L1 and L2. The block matching unit 16 coupled to the line buffers 12 and 14 generates first macroblocks Ma and second macroblocks Mb on the real pixel rows L1 and L2, respectively, and performs the block matching to find a minimum block difference Dmin(x) and a detected direction of the target pixel Pd(x). The detected direction is represented by a detected direction value D(x). The interpolation operation unit 18 coupled to the line buffers 12 and 14 and the block matching unit 16 generates the pixel data of the corresponding target pixel Pd(x) according to the pixel data of the real pixel rows L1 and L2 and the detected direction value D(x).

Assume that the block matching unit 16 includes a plurality of direction indexes m, finds a first macroblock Ma(m) from the pixels Pa(j) and finds a corresponding second macroblock Mb(m) from the pixels Pb(j) according to one of the direction indexes. In this case, a connection line connecting a center pixel of the first macroblock to a center pixel of the corresponding second macroblock is the direction indicated by the direction index m, and the target pixel Pd(x) is disposed on the connection line. In this embodiment, the direction indexes m are −2, −1, 0, 1 and 2 as illustrative examples, as shown in FIG. 2. Thus, the paired first and second macroblocks Ma(−2) and Mb(−2), Ma(−1) and Mb(−1), Ma(0) and Mb(0), Ma(1) and Mb(1) and Ma(2) and Mb(2) may be found on the five direction indexes.

Each of the first macroblocks and the second macroblocks includes k pixels, wherein the detailed steps of the block matching will be illustrated according to an example, in which k is equal to 3, in this embodiment, as shown in FIG. 2. Thus, the first macroblocks Ma(−2) to Ma(2) respectively include pixels Pa(x−3) to Pa(x−1), Pa(x−2) to Pa(x), Pa(x−1) to Pa(x+1), Pa(x) to Pa(x+2) and Pa(x+1) to Pa(x+3), and the pixels of the second macroblocks Mb(−2) to Mb(2) may be analogized according to the rules mentioned hereinabove. The center pixel mentioned hereinabove is the pixel of the first or second macroblock closest to the center point. For example, if the first macroblock Ma(−2) includes Pa(x−3), Pa(x−2) and Pa(x−1), the center pixel is Pa(x−2).

The block matching unit 16 performs the block matching on the corresponding first and second macroblocks to find a block difference Diff(m) corresponding to each direction index. For example, the block matching unit 16 generates differences between pixel values of the corresponding pixels of the first macroblock Ma(−2) and the second macroblock Mb(−2), takes absolute values of the differences, and then sums the absolute values to get the block difference. That is, the block difference Diff(−2) of the direction index (m=−2) may be represented by:

$$\text{Diff}(-2)=|Pa(x-3)-Pb(x+3)|+|Pa(x-2)-Pb(x+2)|+|Pa(x-1)-Pb(x+1)|.$$

Then, the block matching unit 16 further calculates the block differences Diff(−1) to Diff(2) of the other direction indexes, finds the minimum of the block differences Diff(−2) to Diff(2) as the minimum block difference Dmin(x), and outputs the detected direction value D(x) with the direction index corresponding thereto serving as the detected direction. For example, if the minimum of Diff(−2) to Diff(2) is Diff(1), the minimum block difference Dmin(x) is equal to Diff(1) and the detected direction value D(x) is equal to 1.

Figure 3:
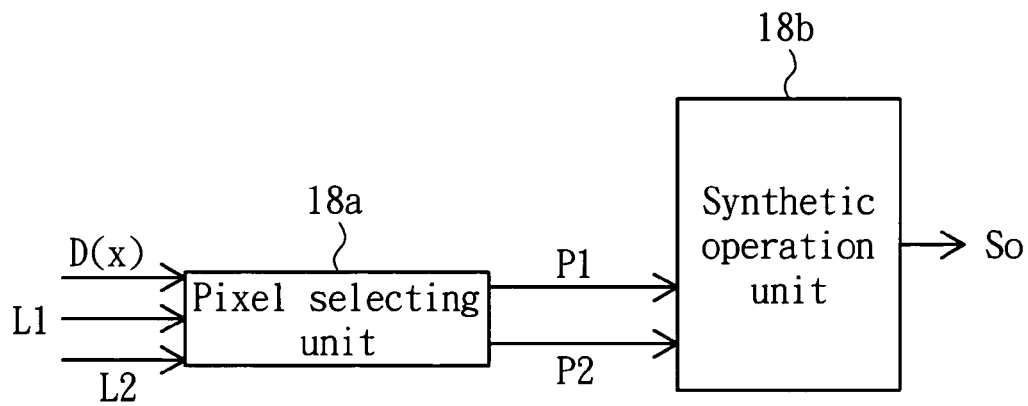
FIG. 3 is a detailed block diagram showing an interpolation operation unit of FIG. 1.

FIG. 3 is a detailed block diagram showing the interpolation operation unit 18 of FIG. 1. Referring to FIG. 3, the interpolation operation unit 18 includes a pixel selecting unit 18a and a synthetic operation unit 18b. The pixel selecting unit 18a receives the detected direction value D(x) and the pixel data of each pixel of the real pixel rows L1 and L2, and finds the pixel data corresponding to a first reference pixel P1 and a second reference pixel P2 from the real pixel rows L1 and L2 according to the detected direction value D(x). For example, as assumed hereinabove, the detected direction value D(x) outputted from the block matching unit 16 is equal to 1. In this case, the pixel selecting unit 18a selects, from the real pixel rows L1 and L2, the pixel data of the pixels Pa(x+1) and Pb(x−1) on the direction index m equal to 1 to serve as the pixel data of the first reference pixel P1 and the second reference pixel P2.

The synthetic operation unit 18b receives the pixel data of the first and second reference pixels P1 and P2 and performs the interpolating calculation to obtain an interpolated result as the pixel data of the target pixel Pd(x) for output.

The pixel interpolation apparatus 10 of this embodiment first divides each real pixel into blocks, and then performs the block matching to find the detected direction value D(x) and obtains the pixel data So according to the pixel data of the first reference pixel P1 and the second reference pixel P2 corresponding to the detected direction value D(x). Thus, the pixel interpolation apparatus 10 of this embodiment can select the pixel data of the first reference pixel P1 and the second reference pixel P2 with the higher similarity and obtain the pixel data So by way of calculation according to the pixel data of the first reference pixel P1 and the second reference pixel P2 with the higher similarity so that the target pixel Pd(x) and its neighboring pixels have similar pixel data. Consequently, it is possible to decrease the possibility of generating the flicker, blur and nonuniform color in the progressive frame effectively.

Figure 4:
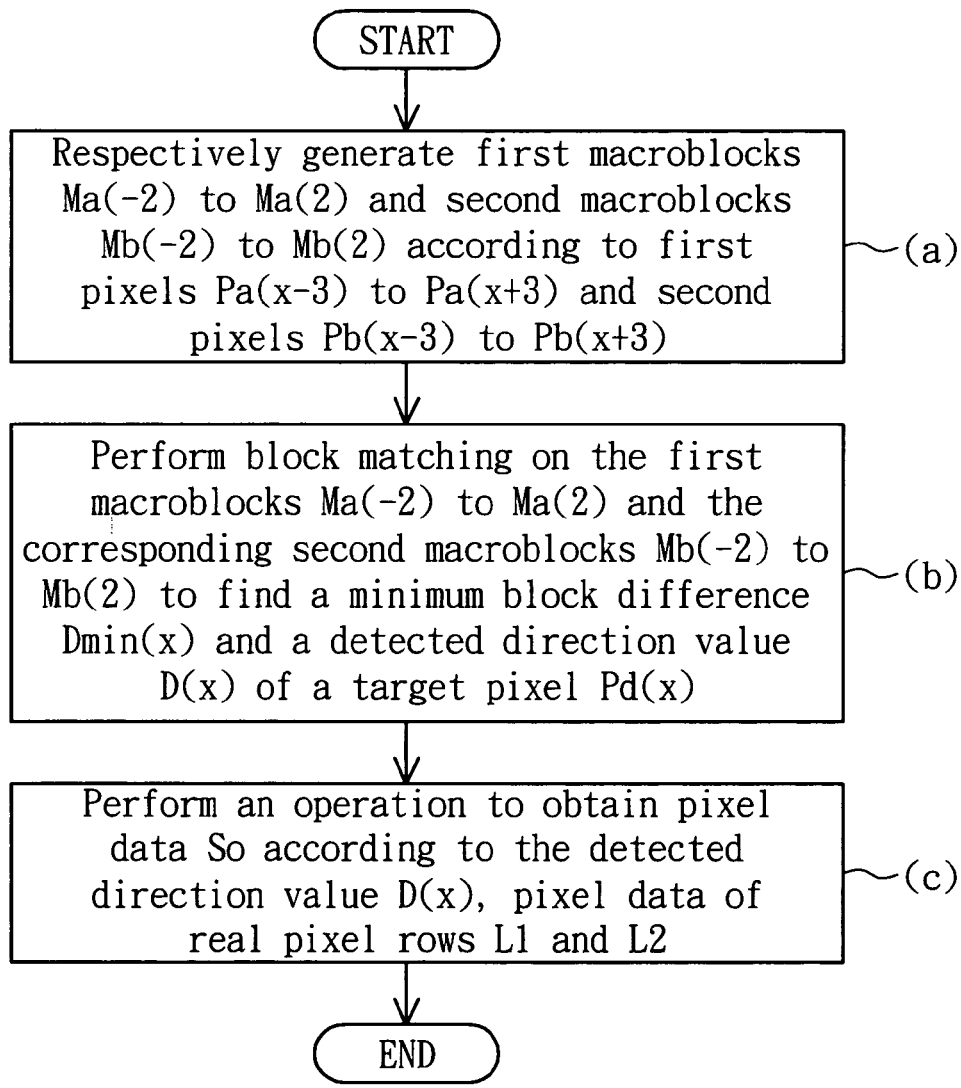
FIG. 4 is a flow chart showing an interpolation method according to the first embodiment of the invention.

FIG. 4 is a flow chart showing an interpolation method according to the first embodiment of the invention. As shown in step (a), the block matching unit 16 generates the first macroblocks and the second macroblocks (e.g., Ma(−2) to Ma(2) and Mb(−2) to Mb(2)) according to the pixels (e.g., Pa(x−3) to Pa(x+3) and Pb(x−3) to Pb(x+3)) of the real pixel rows L1 and L2, respectively.

Next, as shown in step (b), the block matching unit 16 performs the block matching on the first macroblocks (e.g., Ma(−2) to Ma(2)) and the corresponding second macroblocks (e.g., Mb(−2) to Mb(2)) to find the minimum block difference Dmin(x) and the detected direction value D(x) of the target pixel Pd(x). Thereafter, as shown in step (c), the interpolation operation unit 18 finds the pixel data of the first reference pixel P1 and the second reference pixel P2 from the real pixel rows L1 and L2 according to the detected direction value D(x), and performs the calculation to obtain the pixel data So of the target pixel Pd(x) according to the pixel data of the first reference pixel P1 and the second reference pixel P2.

In this embodiment, the operations of the pixel interpolation apparatus 10 are illustrated by taking the condition, in which m and k are respectively equal to 5 and 3, as an example. However, m and k are not particularly limited thereto and may be equal to other values.

Second Embodiment

Figure 5:
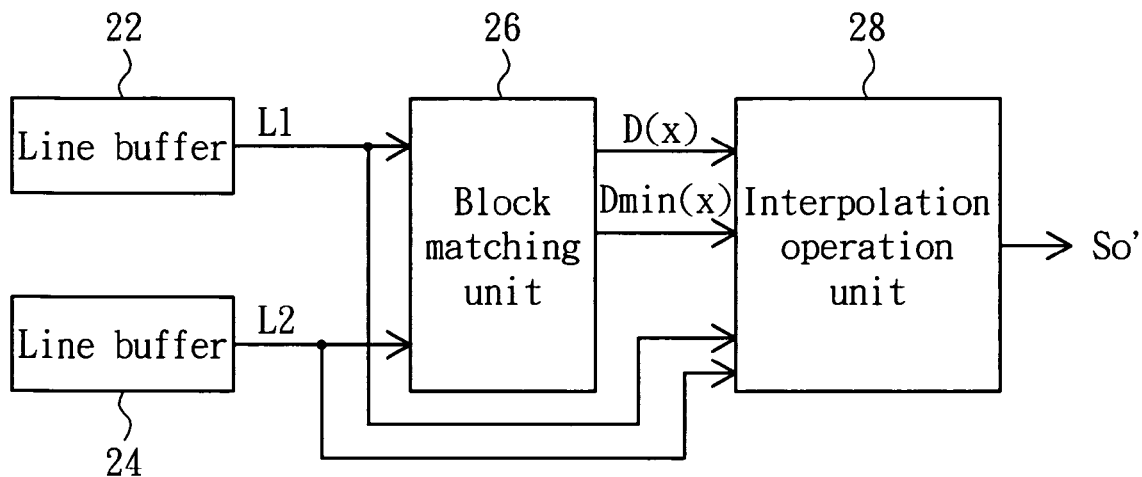
FIG. 5 is a block diagram showing a pixel interpolation apparatus according to a second embodiment of the invention.
Figure 6:
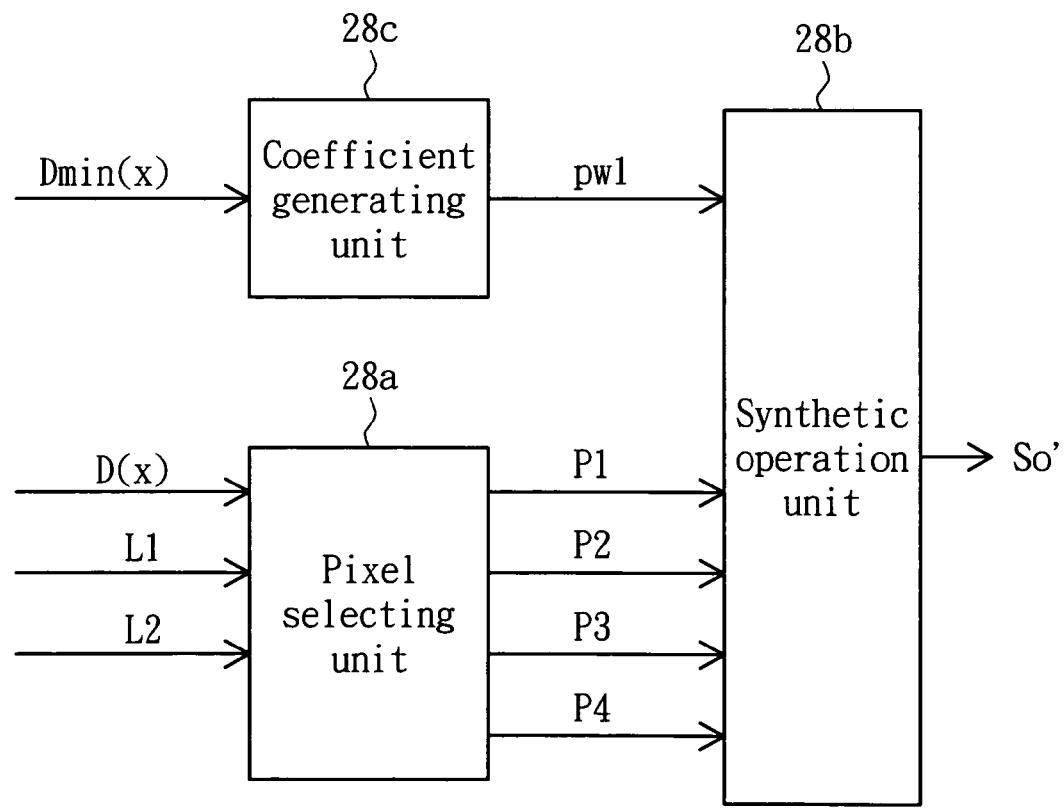
FIG. 6 is a detailed block diagram showing an interpolation operation unit of FIG. 5.

FIG. 5 is a block diagram showing a pixel interpolation apparatus 20 according to a second embodiment of the invention. FIG. 6 is a detailed block diagram showing an interpolation operation unit of FIG. 5. As shown in FIGS. 5 and 6, the difference between the pixel interpolation apparatus 20 of this embodiment and the pixel interpolation apparatus 10 of the first embodiment will be described in the following. A block matching unit 26 outputs the minimum block difference Dmin(x) to an interpolation operation unit 28, which generates a first weighting coefficient pw1 according to the minimum block difference Dmin(x). In addition, the data generated according to the first weighting coefficient pw1 and the first and second calculated data (not shown) serves as the pixel data So' of the target pixel Pd(x).

The first calculated data may be, for example, the data calculated by the interpolation operation unit 28 according to the pixel data of the first reference pixel P1 and the second reference pixel P2, and the second calculated data may be, for example, the data calculated by the interpolation operation unit 28 according to pixel data of a third reference pixel P3 and a fourth reference pixel P4. The pixels P3 and P4 are respectively disposed on the real pixel rows L1 and L2 and correspond to each other. In this embodiment, the pixels P3 and P4 are respectively the pixels Pa(x) and Pb(x) corresponding to the detected direction value 0.

In this embodiment, the difference between the interpolation operation unit 28 and the interpolation operation unit 18 of the first embodiment is that the interpolation operation unit 28 further includes a coefficient generating unit 28c for receiving the minimum block difference Dmin(x) and comparing the minimum block difference Dmin(x) with a first threshold value th1 to generate the first weighting coefficient pw1. For example, the first weighting coefficient pw1 may be set according to the following rules.

$$pw1 = \begin{cases} 1 & Dmin < (th1)/4 \\ 0.75 & (th1)/4 < Dmin < (th1)/2 \\ 0.5 & (th1)/2 < Dmin < th1 \\ 0.25 & th1 < Dmin \end{cases}$$

A pixel selecting unit 28a can find the pixel data of the first reference pixel P1 and the second reference pixel P2 from the real pixel rows L1 and L2 according to the detected direction value D(x), further select the pixel data of the third and fourth reference pixels P3 and P4 from the real pixel rows L1 and L2, and output the selected pixel data. A synthetic operation unit 28b receives pixel data of the first to fourth reference pixels P1 to P4, generates first calculated data s1 according to the pixel data of the first and second reference pixels P1 and P2, and generates second calculated data s2 according to the pixel data of the third and fourth reference pixels P3 and P4. In this embodiment, the first and second calculated data may be represented by the following equations:

$s1=P1+P2$, and $s2=P3+P4$.

The synthetic operation unit 28b further determines weighting coefficients of the first calculated data and the second calculated data according to the first weighting coefficient pw1, and the obtained values serve as the pixel data So'. For example, the synthetic operation unit 28b may calculate So' according to the following equation:

$$So' = \frac{1}{2}[s1 \times pw1 + s2 \times (1 - pw1)].$$

In this embodiment, the first weighting coefficient pw1 may be regarded as a reliability coefficient of the first and second reference pixels found through the block matching, and the reliability thereof is increased with the reduction of the minimum block difference Dmin(x). The pixel interpolation apparatus 20 of this embodiment may allocate the weighting coefficients of the first calculated data and the second calculated data according to the first weighting coefficient pw1 so that the pixel data So' can approach the ideal value effectively.

Figure 7:
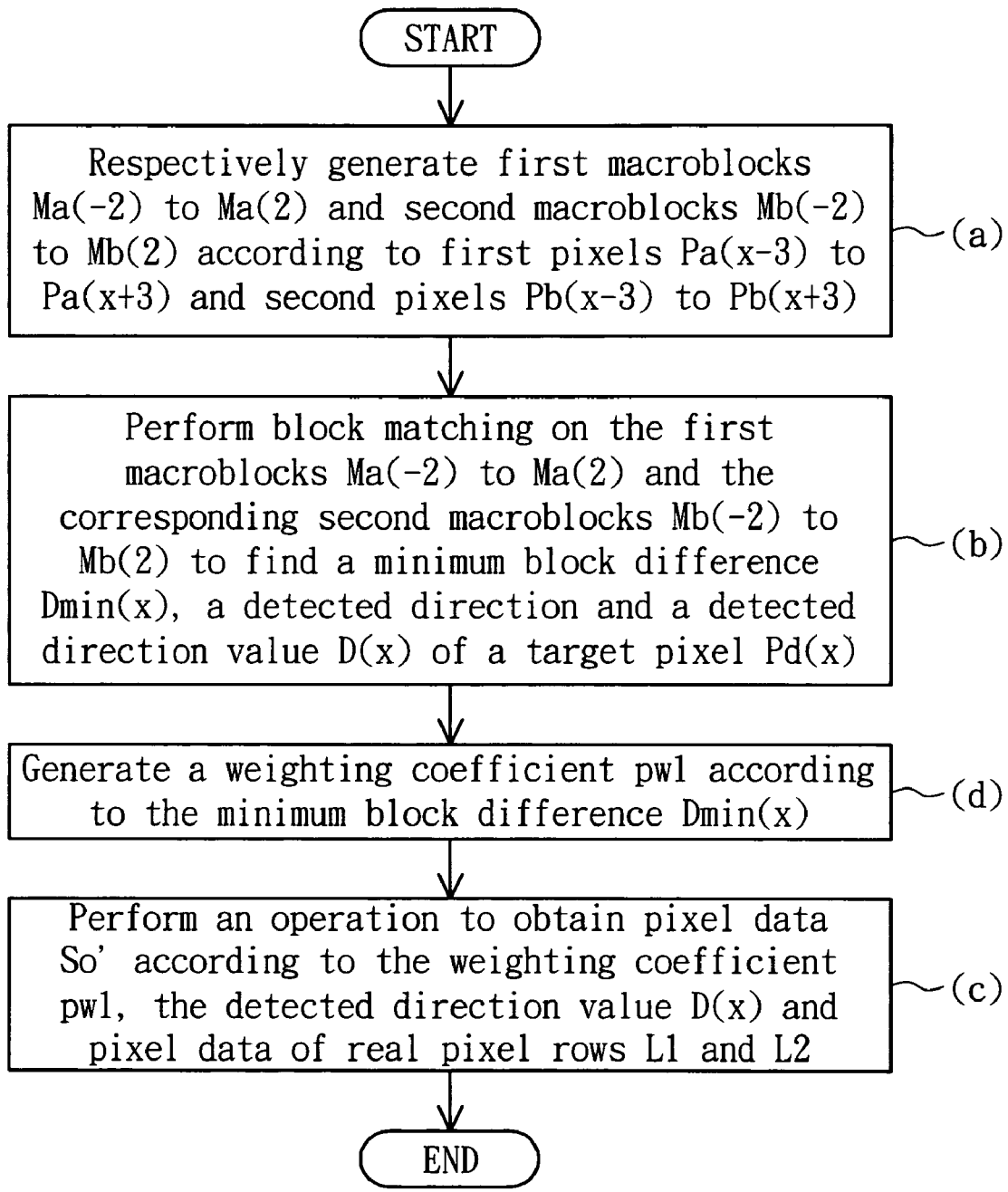
FIG. 7 is a flow chart showing an interpolation method according to the second embodiment of the invention.

FIG. 7 is a flow chart showing an interpolation method according to the second embodiment of the invention. As shown in FIG. 7, the difference between the interpolation method of the second embodiment and the interpolation method of the first embodiment is that the interpolation method of the second embodiment further includes a step (d), in which the coefficient generating unit 28c compares the minimum block difference Dmin(x) with the first threshold value th1, and generates the first weighting coefficient pw1 according to the compared result. In the step (c) of this embodiment, the synthetic operation unit 28b further generates the second calculated data according to the pixel data of the third reference pixel P3 and the fourth reference pixel P4 and determines the weighting coefficients of the first and second calculated data according to the first weighting coefficient pw1 so that the pixel data So' of the target pixel Pd(x) is calculated.

Third Embodiment

Figure 8:
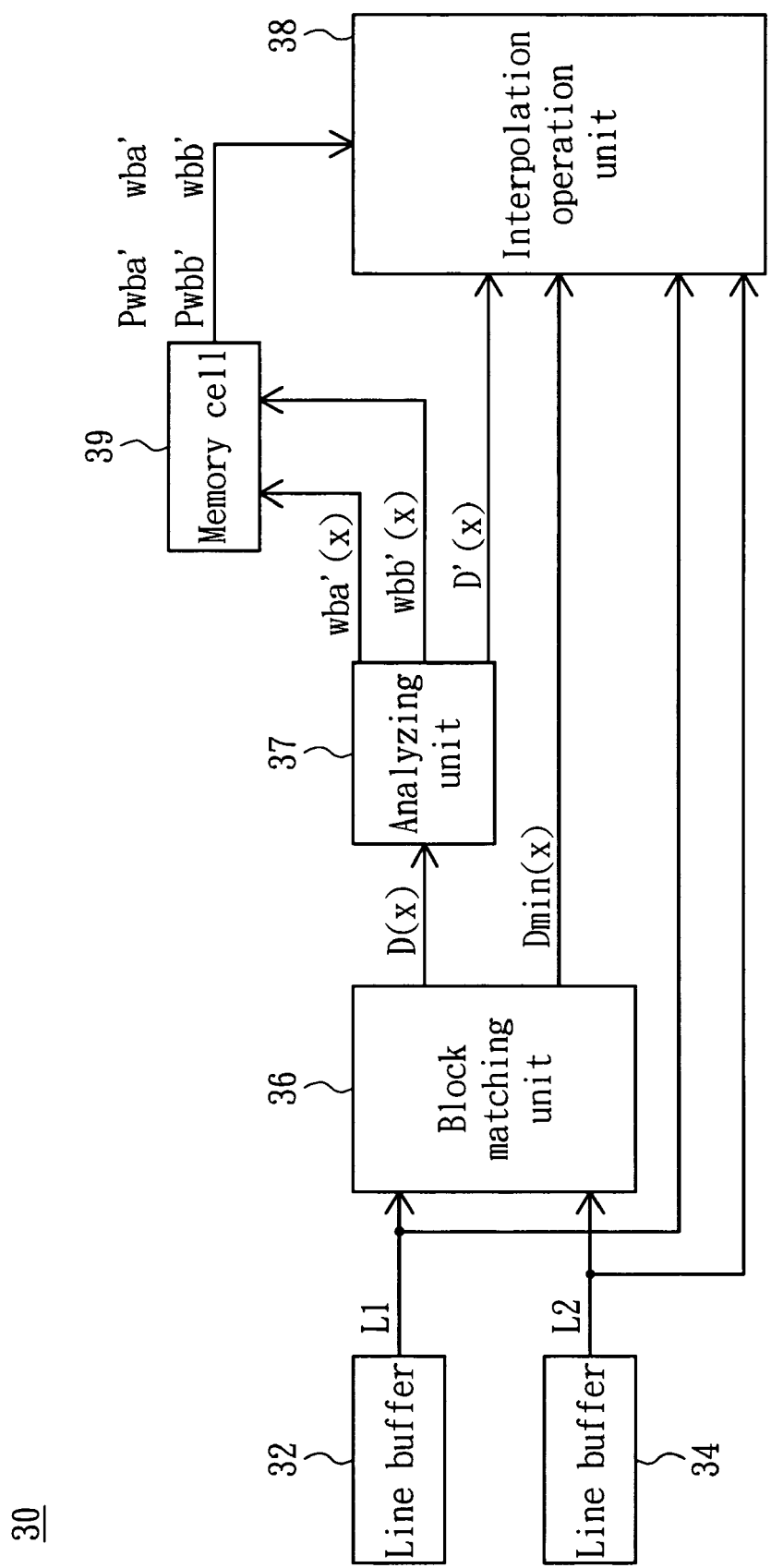
FIG. 8 is a block diagram showing a pixel interpolation apparatus according to a third embodiment of the invention.
Figure 9:
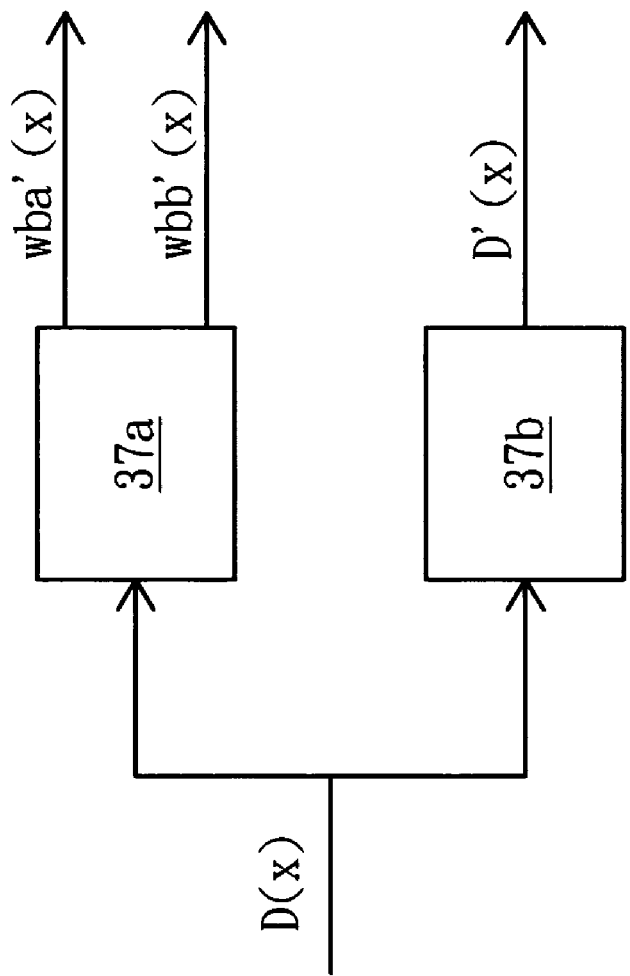
FIG. 9 is a detailed block diagram showing an analyzing unit of FIG. 8.

FIG. 8 is a block diagram showing a pixel interpolation apparatus 30 according to a third embodiment of the invention. FIG. 9 is a detailed block diagram showing an analyzing unit of FIG. 8. As shown in FIGS. 8 and 9, the difference between the third and second embodiments is that the pixel interpolation apparatus 30 of the third embodiment further includes an analyzing unit 37 and a memory unit 39. The analyzing unit 37 generates an interpolation direction value D'(x) and indication labels wba(x) and wbb(x) according to the detected direction value D(x). The memory unit 39 stores the indication labels wba(x) and wbb(x).

As shown in FIG. 9, the analyzing unit 37 includes a label setting unit 37a for judging the detected direction of the target pixel Pd(x) and thus finding the direction type of the target pixel Pd(x). In this embodiment, the direction index m is classified into three kinds, wherein negative direction indexes (−1, −2, ... ) are categorized into the kind A, positive direction indexes (1, 2, ... ) are categorized into the kind B, and the direction index of 0 is categorized into the kind C. For example, when the label setting unit 37a detects that the detected direction value D(x) of the target pixel Pd(x) is equal to 1, the direction type of the target pixel Pd(x) is set as the kind B. In addition, a set of indication labels (wba(x), wbb(x)) is assigned to the target pixel Pd(x) according to different direction types. In this embodiment, the indication labels with the directions of the kind A are set as (wba, wbb)=(1, 0), the indication labels with the directions of the kind B are set as (wba, wbb)=(0, 1) and the indication labels with the directions of the kind C are set as (wba, wbb)=(0, 0). Thus, when the direction type of the target pixel Pd(x) pertains to the kind B, the target pixel Pd(x) has the indication labels (wba(x), wbb(x))=(0, 1).

In addition, the label setting unit 37a further detects a plurality of pixel direction types around the target pixel Pd(x)

to correct the indication labels wba(x) and wbb(x) into wba'(x) and wbb'(x) according to the following judgement rules:

```
if { (wba(x − s) = 1) & (wba(x − s + 1) = 1) & ...
    & (wba(x) = 1) & ... & (wba(x + s − 1) = 1) & (wba(x + s) = 1) }
        wba'(x) = 1
else
        wba'(x) = 0
and
if { (wbb(x − s) = 1) & (wbb(x − s + 1) = 1) & ... & (wbb(x) = 1) & ...
    & (wbb(x + s − 1) = 1) & (wbb(x + s) = 1) }
        wbb'(x) = 1
else
        wbb'(x) = 0
``` wherein s represents the detection range. According to the above-mentioned judgement mechanism, it is possible to ensure whether the detected direction of the target pixel Pd(x) is reliable. For example, when the detected directions of all pixels in the detection range belong to the same kind, its represents that the detected direction of the target pixel Pd(x) is reliable. However, if the detected direction of any one pixel is different from those of the other pixels in the detection range, the detected direction of the target pixel Pd(x) is regarded as unreliable, and the indication labels thereof are corrected into (wba'(x), wbb'(x))=(0, 0). That is, the corrected detected direction value D(x) thereof is equal to 0. The corrected indication labels (wba'(x), wbb'(x)) are stored in the memory unit 39.

The analyzing unit 37 further includes a direction correction unit 37b for generating the interpolation direction value D'(x) according to the detected direction values of a plurality of pixels neighboring the target pixel Pd(x). In this embodiment, the direction correction unit 37b finds a median of {D(x−s), D(x−s+1), ..., D(x), ..., D(x+s−1), D(x+s)} as the interpolation direction value D'(x), wherein s represents the detection range. For example, when s=2 and if {D(x−2), D(x−1), D(x), D(x+1), D(x+2)}={4, −2, −6, −1, −2}, they are sorted from small to big to obtain [−6, 4, −2, −2, −1], and the interpolation direction value D'(x) of the target pixel Pd(x) is equal to −2.

Figure 10:
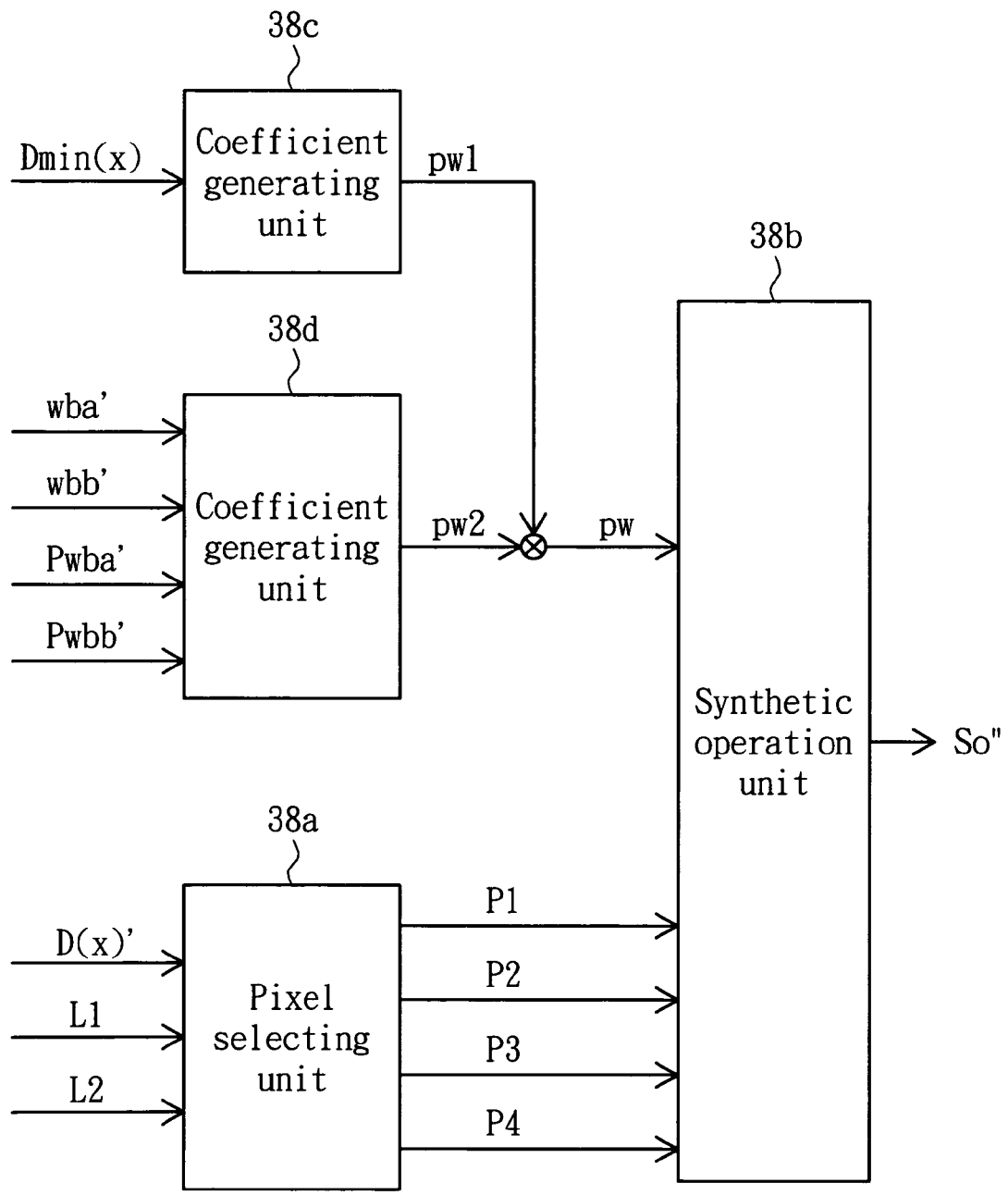
FIG. 10 is a detailed block diagram showing a synthetic operation unit of FIG. 8.

FIG. 10 is a detailed block diagram showing an interpolation operation unit 38 of FIG. 8. As shown in FIG. 10, the difference between the interpolation operation unit 38 of the third embodiment and the interpolation operation unit 28 of the second embodiment is that the interpolation operation unit 38 further includes a coefficient generating unit 38d for receiving and generating a second weighting coefficient pw2 according to the indication label.

A pixel selecting unit 38a selects the pixel data of the first and second reference pixels P1 and P2 and the pixel data of the third and fourth reference pixels P3 and P4 from the pixel data of the real pixel rows L1 and L2 according to the interpolation direction value D'(x). In this embodiment, the third and fourth reference pixels P3 and P4 are Pa(x) and Pb(x), respectively.

The coefficient generating unit 38d reads the indication labels (wba'(x), wbb'(x)) of each pixel of the interpolated pixel row from the memory 39, and generates the second weighting coefficient pw2 by way of calculation according to the indication labels (wba', wbb') of the pixels neighboring the target pixel Pd(x) and the indication labels of the pixels (the indication labels (Pwba', Pwbb') of the pixel neighboring Pd'(x)) corresponding to the same horizontal position of the target pixel Pd(x) in the previously interpolated pixel row (i.e., L4 in FIG. 2). The coefficient generating unit 38d first obtains summated coefficients sum_a(x) and sum_b(x) according to the equation:

if $wba'(x) = 1$ $$pw2 = \frac{|\text{sum\_a}(x) - \text{sum\_b}(x)|}{\text{sum\_a}(x)}$$

elseif $wbb'(x) = 1$ $$pw2 = \frac{|\text{sum\_a}(x) - \text{sum\_b}(x)|}{\text{sum\_b}(x)}$$

$$\begin{cases} \text{sum\_a}(x) = \sum_{i=x-s}^{x+s} [wba'(i) - Pwba'(i)] \\ \text{sum\_b}(x) = \sum_{i=x-s}^{x+s} [wbb'(i) - Pwbb'(i)] \end{cases}$$

wherein s represents the detection range. Also, the coefficient generating unit 38d determines the second weighting coefficient pw2 according to the following judgement conditions.

A synthetic operation unit 38b allocates the weighting coefficients of the first calculated data (s1) and the second calculated data (s2) according to the weighting coefficient pw generated based on the weighting coefficients pw1 and pw2, and outputs the obtained data as the pixel data So" of the target pixel Pd(x). In this embodiment, the weighting coefficient pw is a product of the first and second weighting coefficients pw1 and pw2. The pixel data So" of the target pixel Pd(x) may be obtained according to the following equation:

$$So'' = \frac{1}{2}[s1 \times pw + s2 \times (1 - pw)].$$

Figure 11:
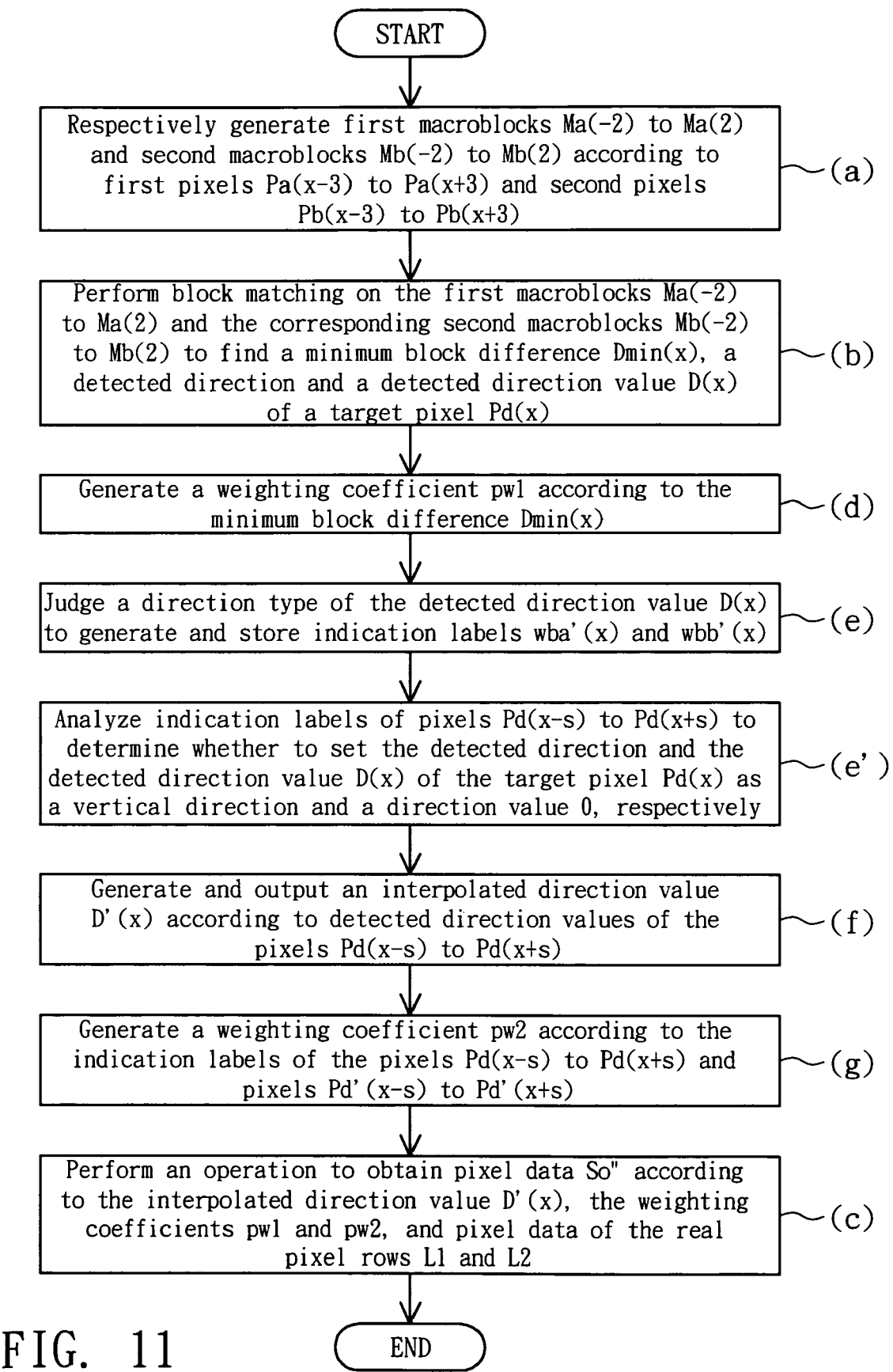
FIG. 11 is a flow chart showing a pixel interpolation method according to the third embodiment of the invention.

FIG. 11 is a flow chart showing a pixel interpolation method according to the third embodiment of the invention. As shown in FIG. 11, the difference between the pixel interpolation method of this embodiment and the pixel interpolation method of the second embodiment is that the pixel interpolation method of this embodiment further includes, after the step (b), the steps (e), (f) and (g). As shown in step (e), the label setting unit 37a judges the direction type of the detected direction value D(x) and thus generates and stores the indication labels wba'(x) and wbb'(x), and the memory unit 39 stores the indication label of each pixel of each interpolated pixel row in the interlaced input field data 100, and outputs the indication labels wba', wbb', Pwba' and Pwbb' to the interpolation operation unit 38.

Next, as shown in step (f), the direction correction unit 37b generates and outputs the interpolation direction value D'(x) to the interpolation operation unit 38 according to the detected direction values of the pixels Pd(x−s) to Pd(x+s). Then, as shown in step (g), the coefficient generating unit 38d generates the second weighting coefficient pw2 according to the indication labels of the pixels Pd(x−s) to Pd(x+s) of the interpolated pixel row L3 and the pixels Pd'(x−s) to Pd'(x+s) of the previously interpolated pixel row L4, wherein s represents the detection range.

In step (c), the synthetic operation unit 38b allocates the weighting coefficients of the first calculated data (s1) and the second calculated data (s2) according to the weighting coefficient pw generated based on the weighting coefficients pw1 and pw2, and the generated data serves as the pixel data So" of the target pixel Pd(x).

The method may further include, between the steps (e) and (f), a step (e'), in which the label setting unit 37*a* analyzes the indication labels of the pixels Pd(x−s) to Pd(x+s), for example, to judge whether they belong to the same direction type. When not all of the pixels Pd(x−s) to Pd(x+s) belong to the same direction type, the detected direction of the target pixel Pd(x) and the detected direction value D(x) are respectively modified into the vertical direction and the detected direction value 0.

In this illustrated embodiment, the analyzing unit 37 only includes the direction correction unit 37*b* for generating the interpolation direction value D'(x) according to the detected direction values of the pixels Pd(x−s) to Pd(x+s), and the pixel selecting unit 38*a* for selecting the pixel data of the first and second reference pixels P1 and P2 according to the interpolation direction value D'(x). However, the direction correction unit 37*b* may also be omitted from the analyzing unit 37 of this embodiment, and the pixel selecting unit 38*a* selects the first and second reference pixels P1 and P2 according to the detected direction value D(x). Consequently, the step (f) may also be omitted from the pixel interpolation method of this embodiment, and the interpolation direction value D'(x) may also be replaced with the detected direction value D(x) in step (c).

In this illustrated embodiment, the interpolation operation unit 38 has the coefficient generating units 38*c* and 38*d* for respectively generating the first and second weighting coefficients pw1 and pw2, and the synthetic operation unit 38*b* for generating the pixel data So''' according to the weighting coefficient pw. However, one of the coefficient generating units 38*c* and 38*d* may also be omitted from the interpolation operation unit 38 of this embodiment, and only the weighting coefficient pw1 or pw2 serves as the weighting coefficient pw for the allocation of the weighting coefficients of the first and second calculated data. Thus, one of the steps (d) and (g) may also be omitted from the pixel interpolation method of this embodiment, and the steps associated with the reference weighting coefficient pw1 or pw2 may also be omitted from step (c).

Fourth Embodiment

Figure 12:
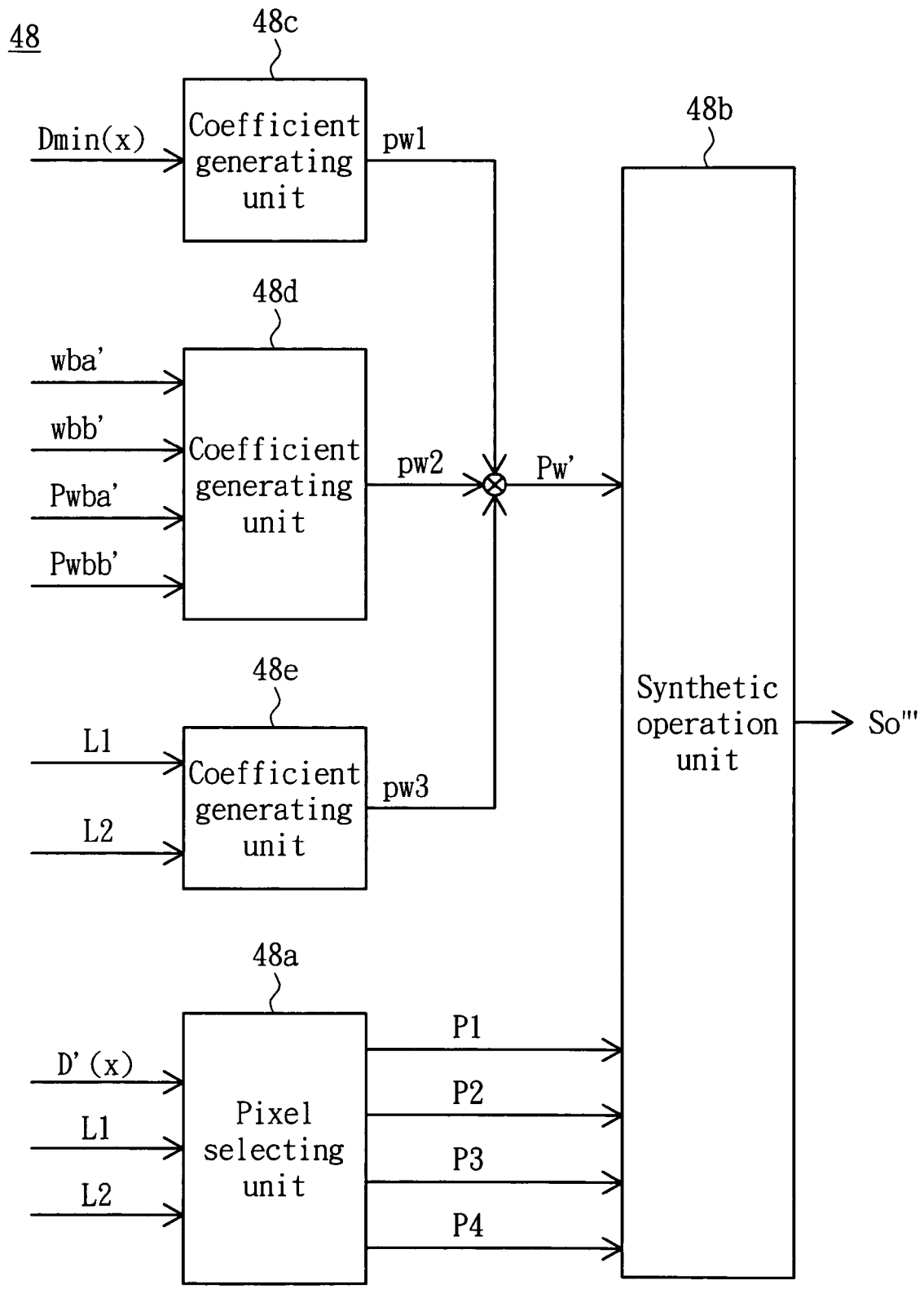
FIG. 12 is a block diagram showing an interpolation operation unit of a pixel interpolation apparatus according to a fourth embodiment of the invention.

FIG. 12 is a block diagram showing an interpolation operation unit 48 of a pixel interpolation apparatus 40 according to a fourth embodiment of the invention. As shown in FIG. 12, the pixel interpolation apparatus 40 of this embodiment is almost the same as the pixel interpolation apparatus 30 of the third embodiment except for the difference in the circuit structure of the interpolation operation unit 48. In this embodiment, the interpolation operation unit 38 is replaced with the interpolation operation unit 48. Compared with the interpolation operation unit 38, the interpolation operation unit 48 further includes a coefficient generating unit 48*e* for generating a weighting coefficient pw3.

The coefficient generating unit 48*e* receives the pixel data of the real pixel rows L1 and L2 and obtains the summated coefficient sum_diff according to the equation:

$$\text{sum\_diff} = \sum_{i=x-s}^{x+s} (|Pa(i) - Pa(i-1)| + |Pb(i) - Pb(i-1)|),$$

wherein s is the detection range. |Pa(i)−Pa(i−1)| and |Pb(i)−Pb(i−1)| respectively represent an absolute value of a difference between two neighboring pixel data of the real pixel row L1 in a detection window, and an absolute value of a difference between two neighboring pixel data of the real pixel row L2 in the detection window.

The coefficient generating unit 48*e* compares the summated coefficient sum_diff with a second threshold value th2 to generate a third weighting coefficient pw3. For example, the third weighting coefficient pw3 may be set according to the following condition:

$$pw3 = \begin{cases} 0.25 & \text{sum\_diff} < (th2)/4 \\ 0.5 & (th2)/4 < \text{sum\_diff} < (th2)/2 \\ 0.75 & (th2)/2 < \text{sum\_diff} < (th2) \\ 1 & (th2) < \text{sum\_diff} \end{cases}.$$

A synthetic operation unit 48*b* allocates the weighting coefficients of the first and second calculated data according to a weighting coefficient Pw' generated based on the weighting coefficients pw1 to pw3, and the generated data serves as the pixel data So''' of the target pixel Pd(x). In this embodiment, the weighting coefficient Pw' is equal to the product of pw1, pw2 and pw3. For example, the synthetic operation unit 48*b* generates the pixel data So''' according to the equation:

$$So''' = s1 \times Pw' + s2 \times (1 - Pw'),$$

wherein s1 and s2 are respectively the first and second calculated data.

The data difference between the pixel data of the pixels in an uneven region of the frame is greater than that in an even region of the frame. Thus, when the evenness of the pixels neighboring the target pixel Pd(x) is considered, the possibility of generating the interpolated target pixel Pd(x) pertaining to an unwanted spot of the frame may be decreased. In this embodiment, the summated coefficient sum_diff serves as the evenness coefficient in the detected region, and corresponds to the detection of the evenness of the frame neighboring the target pixel Pd(x). The weighting coefficient of the third weighting coefficient pw3 is reduced when the frame is evener. Thus, increasing the weighting coefficients of the third and fourth reference pixels P3 and P4 neighboring the target pixel Pd(x) can reduce the data difference between the pixel data of the pixel data So''' and the ambient pixel. Thus, the pixel interpolation apparatus 40 of this embodiment can effectively make the pixel data So''' approach the ideal values according to the third weighting coefficient pw3, and decrease the possibility of forming the unwanted spot by the target pixel Pd(x) in the frame.

Figure 13:
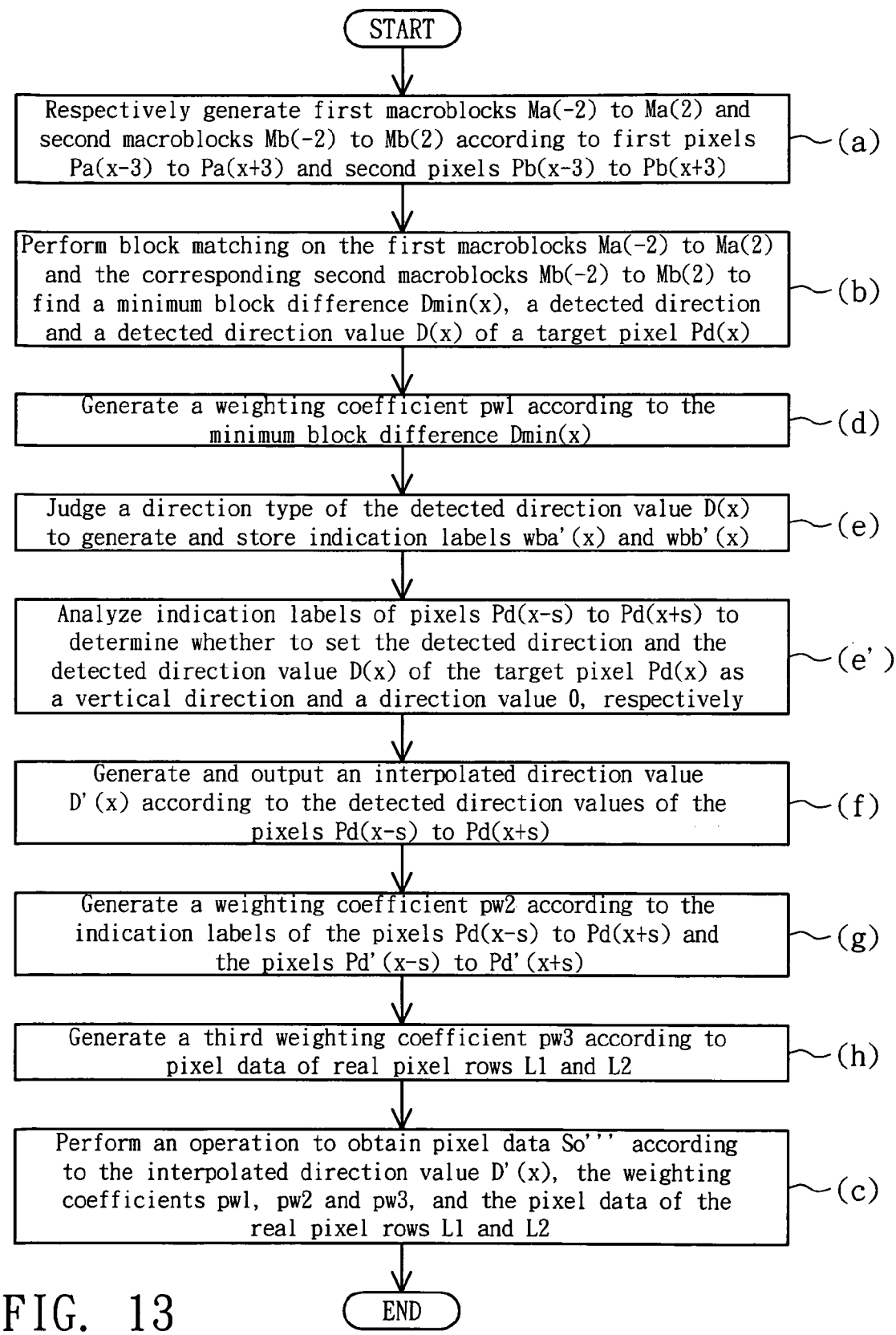
FIG. 13 is a flow chart showing a pixel interpolation method according to the fourth embodiment of the invention.

FIG. 13 is a flow chart showing a pixel interpolation method according to the fourth embodiment of the invention. As shown in FIG. 13, the difference between the pixel interpolation method of this embodiment and the pixel interpolation method of the third embodiment is that the pixel interpolation method of this embodiment further includes a step (h), in which the coefficient generating unit 48*e* calculates a sum of absolute values of differences between the neighboring pixels to generate the weighting coefficient pw3 according to the real pixel rows L1 and L2 in the detection range. In step (c), the synthetic operation unit 48*b* obtains the weighting coefficient Pw' according to the products of the weighting coefficients pw1, pw2 and pw3, and thus determines the weighting coefficients of the first and second calculated data, and the generated data serves as the pixel data So''' of the target pixel Pd(x).

In this illustrated embodiment, the interpolation operation unit 48 has the coefficient generating units 48*c*, 48*d* and 48*e* for respectively generating the weighting coefficients pw1 to pw3, and the synthetic operation unit 48*b* generates the pixel data So''' according to all the weighting coefficients pw1 to pw3. However, one of the coefficient generating units 48*c* and

48*d* may also be omitted from the interpolation operation unit 48 of this embodiment, and the product of the weighting coefficient pw3 and one of the weighting coefficients pw1 and pw2 serves as the weighting coefficient Pw' for the allocation of the weighting coefficients of the first and second calculated data. Alternatively, both of the coefficient generating units 48*c* and 48*d* may also be omitted from the interpolation operation unit 48 and only the weighting coefficient pw3 serves as the weighting coefficient Pw' for the allocation of the weighting coefficients of the first and second calculated data. Consequently, the steps (g) or (d) may also be omitted from the pixel interpolation method of this embodiment, and the steps associated with the reference weighting coefficients pw1 and pw2 may also be omitted from the step (c).

In the pixel interpolation apparatus and the method thereof of this embodiment, it is also possible to judge the evenness of the frame according to the difference between the pixel data of any two neighboring pixels in the real pixel rows L1 and L2, and thus to generate the third weighting coefficient for the adjustment of the weighting coefficients of the first and second calculated data, wherein the summated data may serve as the pixel data of the target pixel. Consequently, the pixel interpolation apparatus of this embodiment may further decrease the possibility of forming the unwanted spot by the pixel data of the target pixel in the frame so that the quality of the progressive frame is substantially higher.

While the invention has been described by way of examples and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A pixel interpolation apparatus, comprising:
   a first line buffer for storing pixel data of a first real pixel row;
   a second line buffer for storing pixel data of a second real pixel row;
   a block matching unit, coupled to the first line buffer and the second line buffer, for generating a plurality of first macroblocks on the first real pixel row, generating corresponding second macroblocks on the second real pixel row and performing block matching to find a minimum block difference and a detected direction of a target pixel belonging to a first interpolated pixel row;
   an interpolation operation unit, coupled to the block matching unit and the first and second line buffers, for generating the target pixel of the first interpolated pixel row by way of interpolation according to the pixel data of the first real pixel row, the pixel data of the second real pixel row and the detected direction; and
   an analyzing unit, coupled to the block matching unit and the interpolation operation unit, for:
     judging the detected direction to generate a direction type and analyzing direction types of the target pixel and pixels neighboring the target pixel to generate an indication label; and
     analyzing the detected direction of the target pixel and detected directions of the pixels neighboring the target pixel to generate an interpolation direction.

2. The apparatus according to claim 1, wherein the analyzing unit further comprises a memory for storing the indication label.

3. The apparatus according to claim 1, wherein the interpolation operation unit generates a first weighting coefficient according to the minimum block difference, and generates the target pixel of the first interpolated pixel row by way of interpolation according to the pixel data of the first real pixel row, the pixel data of the second real pixel row, the interpolation direction and the first weighting coefficient.

4. The apparatus according to claim 1, wherein the interpolation operation unit generates a second weighting coefficient according to the indication label of the target pixel, indication labels of the pixels neighboring the target pixel, and indication labels of pixels of an interpolated second interpolated pixel row, and generates the target pixel of the first interpolated pixel row by way of interpolation according to the pixel data of the first real pixel row, the pixel data of the second real pixel row, the interpolation direction and the second weighting coefficient.

5. The apparatus according to claim 4, wherein the interpolation operation unit generates a first weighting coefficient according to the minimum block difference, and generates the target pixel of the first interpolated pixel row by way of interpolation according to the pixel data of the first real pixel row, the pixel data of the second real pixel row, the first and second weighting coefficients and the interpolation direction.

6. The apparatus according to claim 1, wherein the interpolation operation unit generates a third weighting coefficient according to the pixel data of the first real pixel row and the pixel data of the second real pixel row, and generates the target pixel of the first interpolated pixel row by way of interpolation according to the pixel data of the first real pixel row, the pixel data of the second real pixel row, the third weighting coefficient and the interpolation direction.

7. The apparatus according to claim 6, wherein the interpolation operation unit generates a first weighting coefficient according to the minimum block difference, and generates the target pixel of the first interpolated pixel row by way of interpolation according to the pixel data of the first real pixel row, the pixel data of the second real pixel row, the first and third weighting coefficients and the interpolation direction.

8. The apparatus according to claim 6, wherein the interpolation operation unit generates a second weighting coefficient according to the indication label of the target pixel, indication labels of the pixels neighboring the target pixel, and indication labels of pixels of an interpolated second interpolated pixel row, and generates the target pixel of the first interpolated pixel row by way of interpolation according to the pixel data of the first real pixel row, the pixel data of the second real pixel row, the interpolation direction and the second and third weighting coefficients.

9. The apparatus according to claim 8, wherein the interpolation operation unit generates a first weighting coefficient according to the minimum block difference, and generates the target pixel of the first interpolated pixel row by way of interpolation according to the pixel data of the first real pixel row, the pixel data of the second real pixel row, the first, the second, the third weighting coefficients and the interpolation direction.

10. The apparatus according to claim 1, wherein the analyzing unit further analyzes the indication label of the target pixel and indication labels of the pixels neighboring the target pixel to determine whether to set the detected direction of the target pixel as a specific direction or not before the interpolation direction is generated.

11. A pixel interpolation method, comprising the steps of:
   (a) generating a plurality of first macroblocks and a plurality of second macroblocks according to pixel data of a first real pixel row and pixel data of a second real pixel row, respectively;

(b) performing block matching on the first and second macroblocks to find a minimum block difference and a detected direction of a target pixel belonging to a first interpolated pixel row;

(c) generating the target pixel of the first interpolated pixel row by way of interpolation according to the pixel data of the first real pixel row, the pixel data of the second real pixel row and the detected direction;

(e) judging the detected direction to generate a direction type and analyzing direction types of the target pixel and the pixels neighboring the target pixel to generate and storing an indication label; and (f) analyzing the detected direction of the target pixel and detected directions of the pixels neighboring the target pixel to generate an interpolation direction.

12. The method according to claim 11, further comprising the step of: (d) generating a first weighting coefficient according to the minimum block difference, wherein the step (c) generates the target pixel of the first interpolated pixel row by way of interpolation further according to the first weighting coefficient and the interpolation direction.

13. The method according to claim 11, further comprising the step of: (g) generating a second weighting coefficient according to the indication label of the target pixel, indication labels of the pixels neighboring the target pixel and indication labels of pixels of an interpolated second interpolated pixel row, wherein the step (c) generates the target pixel of the first interpolated pixel row by way of interpolation further according to the second weighting coefficient and the interpolation direction.

14. The method according to claim 13, further comprising the step of:

(d) generating a first weighting coefficient according to the minimum block difference, wherein the step (c) generates the target pixel of the first interpolated pixel row by way of interpolation further according to the first weighting coefficient.

15. The method according to claim 11, further comprising the step of: (h) generating a third weighting coefficient according to the pixel data of the first real pixel row and the pixel data of the second real pixel row, wherein the step (c) generates the target pixel of the first interpolated pixel row by way of interpolation further according to the third weighting coefficient and the interpolation direction.

16. The method according to claim 15, further comprising the step of:

(d) generating a first weighting coefficient according to the minimum block difference, wherein the step (c) generates the target pixel of the first interpolated pixel row by way of interpolation further according to the first weighting coefficient.

17. The method according to claim 15, further comprising the step of:

(g) generating a second weighting coefficient according to the indication label of the target pixel, indication labels of the pixels neighboring the target pixel, and indication labels of pixels of an interpolated second interpolated pixel row, wherein the step (c) generates the target pixel of the first interpolated pixel row by way of interpolation further according to the second weighting coefficient.

18. The method according to claim 17, further comprising the step of:

(d) generating a first weighting coefficient according to the minimum block difference, wherein the step (c) generates the target pixel of the first interpolated pixel row by way of interpolation further according to the first weighting coefficient.

19. The method according to claim 11, further comprising the step of:

(e') analyzing, before the interpolation direction is generated, the indication label of the target pixel and indication labels of the pixels neighboring the target pixel to determine whether to set the detected direction of the target pixel as a specific direction.

20. The method according to claim 11, wherein the first macroblocks and the second macroblocks comprise the same number of pieces of pixel data.

* * * * *